United States Patent [19]

Archer et al.

[11] Patent Number: 4,839,664

[45] Date of Patent: Jun. 13, 1989

[54] FLUID-JET CATCHER WITH REMOVABLE POROUS METAL INGESTION BLADE

[75] Inventors: Timothy H. V. Archer; Richard Sutera, both of Centerville, Ohio

[73] Assignee: Burlington Industries, Inc., Greensboro, N.C.

[21] Appl. No.: 69,202

[22] Filed: Jul. 2, 1987

[51] Int. Cl.[4] .............. G01D 15/18

[52] U.S. Cl. .............. 346/1.1; 346/75

[58] Field of Search .............. 346/1.1, 75

[56] References Cited

U.S. PATENT DOCUMENTS

| | | | |
|---|---|---|---|
| 3,673,601 | 6/1972 | Hertz | 346/75 |
| 3,701,998 | 10/1972 | Mathis | 346/75 |
| 3,777,307 | 12/1973 | Duffield | 346/75 |
| 3,813,675 | 5/1974 | Steffy et al. | 346/75 |
| 3,836,914 | 9/1974 | Duffield | 346/75 |
| 3,936,135 | 2/1976 | Duffield | 346/1.1 |
| 4,035,811 | 7/1977 | Paranjpe | 346/75 |
| 4,084,164 | 4/1978 | Alt et al. | 346/75 |
| 4,305,079 | 12/1981 | Mix, Jr. | 346/75 |
| 4,460,903 | 7/1984 | Guenther | 346/75 |

FOREIGN PATENT DOCUMENTS 58-69059 4/1983 Japan .

*Primary Examiner*—E. A. Goldberg
*Assistant Examiner*—Gerald E. Preston
*Attorney, Agent, or Firm*—Nixon & Vanderhye

[57] ABSTRACT

A fluid-jet printer has a droplet catcher structure and an ingestion blade whereby deflected charged droplets flow by means of a vacuum from the catcher structure along the ingestion blade for recirculation and reuse. The ingestion blade is preferably flat and is releasably clamped between a retainer plate along the underside of the catcher structure and a set screw threaded into the upper surface of the catcher structure. The ingestion blade is disposed in the opening of a cavity along the underside of the catcher structure and is removable therefrom by backing off the set screw, whereby the blade can be removed through the bottom cavity opening for replacement.

22 Claims, 1 Drawing Sheet

FLUID-JET CATCHER WITH REMOVABLE POROUS METAL INGESTION BLADE

FIELD OF INVENTION

The present invention generally relates to non-contact fluid devices conventionally known as "ink-jet" or "fluid-jet" printers and, more particularly, to a fluid-jet droplet catcher having a porous metal ingestion blade for flowing "caught" fluid-jet droplets and which blade is removable from the fluid-jet catcher for cleaning and reuse or replacement during changeover between different types of fluid.

BACKGROUND AND SUMMARY OF THE INVENTION

Non-contact fluid-jet applicators or printers which use charged and/or uncharged droplets for deposition on a substrate are generally known in the art. Typically, such fluid-jet printers have an array of orifices through an orifice plate in communication with a plenum containing fluid for flowing the fluid through the orifices to form fluid filaments. Individually controllable electrostatic charging electrodes are disposed downstream of the orifice plate along a "droplet formation zone." Alternatively, a single elongated charging electrode may be provided. In accordance with known principles of electrostatic induction, these fluid filaments are provided an electrical charge opposite in polarity but related in magnitude to the electrical charge of the charging electrode. As the droplets break off from the filaments, the charged droplets pass through a subsequent electrostatic field and are thereby deflected from a straight downward path toward a catcher structure. Uncharged droplets proceed along the straight path and are deposited upon the receiving substrate.

Known catcher structures typically have a face onto which the charged droplets impinge. An ingestion blade is spaced from the face to form a slot therewith. The catcher structure includes a vacuum source, which communicates with a chamber disposed above the ingestion blade, to withdraw the caught droplets through the slot and chamber for recirculation and reuse. The ingestion blade is typically made of a porous metal material, such as sintered stainless steel or stainless steel mesh, so that, in the event that a droplet is caught on the blade or on its underside, the vacuum drawn through the porous metal will merge those droplets with the droplets flowing through the slot for recirculation and reuse.

A particular problem arises in fluid-jet applicators for the textile industry where different colors of dyes, especially dispersed dyes, are used. Dye particles may become trapped within the pores of the porous metal, only to be freed from their entrapment after the fluid is changed, for example, after a color change is effected. This, of course, contaminates the new printing fluid, e.g., a new fluid of a different color. This is a particular problem when changing from a darker to a lighter colored fluid. Thus, defects in the appearance of the substrate, for example, after a color change, may occur. Such defects are believed caused by retention of particles from the previous fluid in the ingestion blade, which are then freed and recirculated with the new fluid.

Thus, the present invention addresses this particular problem and affords a novel, unique and simple solution which provides additional benefits in the context of fluid-jet printing apparatus. Particularly, the present invention provides a porous ingestion blade spaced from a tip portion of the catcher structure to form a slot through which deflected droplets pass as they are drawn for recirculation by a vacuum source. In accordance with the present invention, the ingestion blade is disposed in a cavity along the underside of the catcher structure in such manner that it is readily and easily removed from the catcher structure through the bottom of the cavity. To effect this, a retainer plate is disposed along the underside of the catcher structure. A portion of the retainer plate projects to underlie a portion of the cavity. The ingestion blade is releasably clamped between the retainer plate and the catcher structure. The ingestion blade thus extends toward the tip portion of the catcher structure, and defines therewith, the slot through which fluid flows into the catcher structure cavity for recirculation.

Preferably, the ingestion blade is formed in a flat configuration and the clamping structure includes a set screw threadedly received through the upper portion of the catcher structure. The tip of the set screw engages the top of the ingestion blade adjacent one end thereof whereby the blade is clamped between the screw and retainer plate. The opposite end cantilevers toward the tip portion of the catcher structure to form the slot. The edge of the retainer plate is spaced back from the tip portion. Thus, by backing off the set screw to release the ingestion blade, the latter may be canted and withdrawn from the cavity through the opening formed between the retainer plate edge and the catcher structure tip portion.

Another feature of the present invention resides in the formation of the catcher structure such that all of the cavities for fittings and the like may be formed on one side, preferably the underside, of the catcher structure. Those cavities may then be closed by application of the retainer plate to the underside of the catcher structure. Thus, the retainer plate serves the dual purpose of forming part of the clamp for releasably retaining the ingestion blade on the catcher structure and also serves as a closure for the cavities of the catcher structure.

Therefore, in accordance with the present invention, there is provided a droplet catching structure for use in a fluid-jet printing apparatus of the type which generates an array of droplet streams and deflects selected droplets from a normal droplet path to a droplet catching structure including an ingestion blade, means carried by the droplet catching structure defining a droplet catching surface for catching deflected droplets and flowing the deflected droplets to the ingestion blade and means carried by the droplet catching structure for releasably mounting the ingestion blade whereby the ingestion blade may be selectively removed from the structure.

Preferably, the ingestion blade is formed of a porous metal material, e.g., a sintered stainless steel (either spheres or random shape) or stainless steel mesh, and is spaced from the tip portion of the droplet catching structure to define therewith a slot enabling the deflected droplets to flow about the tip portion onto the ingestion blade. The catcher structure defines a cavity above the ingestion blade in communication with the slot, and a vacuum is applied for flowing the caught droplets along a predetermined path.

In a further aspect of the present invention, the ingestion blade is generally flat. Additionally, a retainer plate is secured along the underside of the catcher structure below the cavity and projects toward the tip portion. In this manner, the ingestion blade is disposed on the retainer plate and projects or cantilevers beyond the edge thereof toward the tip portion to substantially close the bottom of the cavity. Preferably, a set screw is threaded into the catching structure to bear on an end portion of the ingestion blade to clamp the blade between the retainer plate and screw. Thus, the ingestion blade is removable from the catcher structure by backing off the screw and removing the blade through the space between the retainer plate edge and the tip portion. Further, multiple cavities are usually disposed along the underside of the catcher structure to distribute the vacuum. These cavities are covered by the retainer plate when secured to the underside of the catching structure.

Accordingly, it is a primary object of the present invention to provide a novel and improved fluid-jet catcher having a porous metal ingestion blade which can be readily and easily removed from the catcher structure for purposes of cleaning and reuse or replacement to avoid contamination of the fluid upon changeover to a different type or color of fluid.

These and further objects and advantages of the present invention will become more apparent upon reference to the following specification, claims and appended drawings.

BRIEF DESCRIPTION OF THE DRAWING FIGURES

FIG. 1 is a fragmentary cross-sectional view of a fluid-jet printing or applicator head having a catcher structure with removable porous metal ingestion plate constructed in accordance with the present invention; and FIG. 2 is an enlarged cross-sectional view of the fluid-jet catcher structure and the removable porous metal ingestion plate.

DETAILED DESCRIPTION OF THE DRAWING FIGURES

Figure 1:
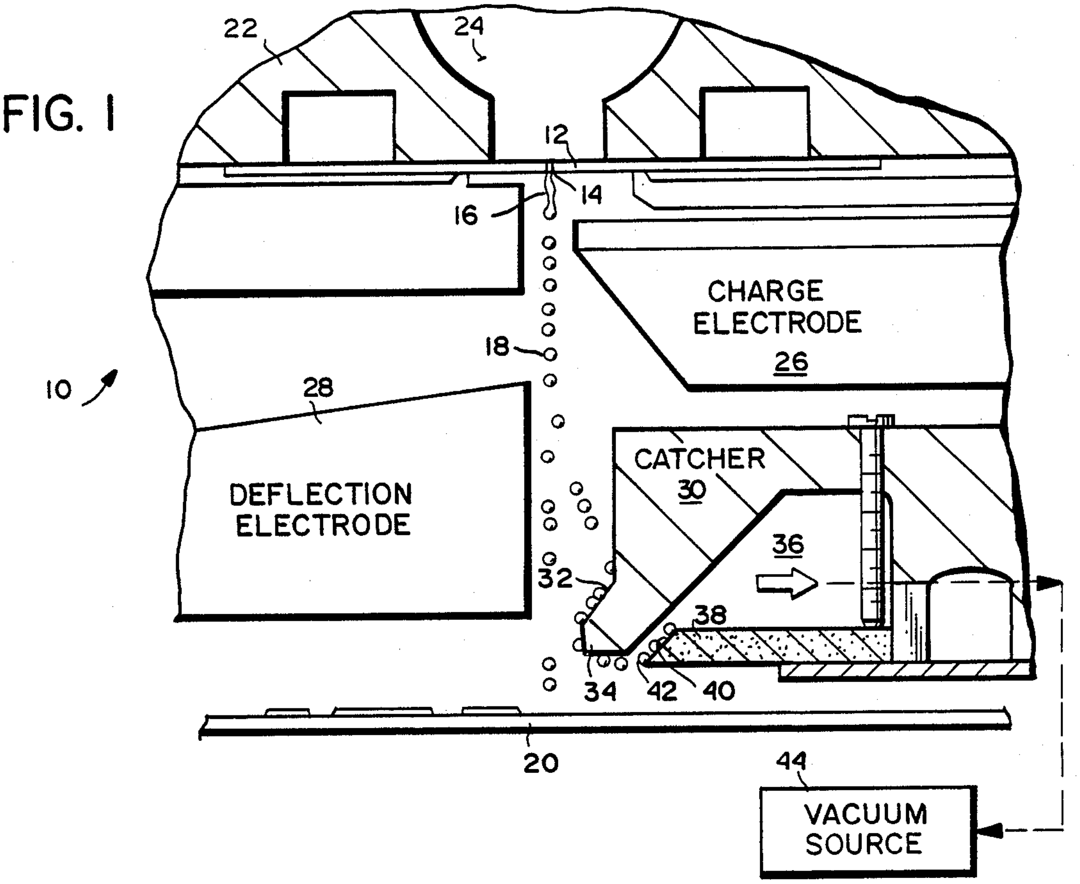

Reference will now be made in detail to the present preferred embodiment of the invention, an illustrative example of which is illustrated in the drawing figures.

Referring now to FIG. 1, there is illustrated a fluid-jet printing or applicator head, generally designated 10, having an orifice plate 12 carrying a linear array of orifices 14. A plurality of fluid streams or filaments 16 issue from orifices 14 so as to generate a sequential plurality of droplets 18 which proceed along a normal droplet path toward a substrate 20 and on which certain of the droplets are deposited. Fluid for the droplets is derived from a distribution bar 22 having a plenum chamber 24 for supplying fluid through orifices 14 in orifice plate 12.

As filaments 16 issue from the orifice plate, selected filaments are charged by means of a charging electrode 26 and droplets 18 formed from those filaments are likewise charged. Along the droplet path downstream of the charging electrode 26 is provided a deflection electrode 28. Deflection electrode 28 provides a deflection field such that, when the selected charged droplets pass through the field, the charged droplets will be deflected from the normal droplet path towards a droplet catcher structure 30. Uncharged droplets, on the other hand, proceed along the normal droplet path for deposition on the substrate 20.

Droplet catcher structure 30 includes an inclined surface 32, a tip portion 34 and a cavity 36 opening through the bottom or underside of the catcher structure 30. An ingestion blade 38 substantially closes the bottom of the cavity opening through the underside of the catcher structure 30. The forward edge 40 of ingestion blade 38 defines a slot 42 with tip portion 34. Conventionally, an ingestion blade is formed of porous metal material, such as sintered stainless steel. Stainless steel mesh may also be used.

In use, the deflected charged droplets flow along the inclined surface 32, about tip portion 34, through slot 42 and into chamber 36. A vacuum source 44 draws a vacuum in cavity 36 whereby the droplets are drawn through the slot into the chamber and the fluid of the deflected and caught droplets is recirculated to plenum chamber 24 for reuse.

It is a particular feature of the present invention that ingestion blade 38 is releasably mounted along the underside of the catching structure such that it can be readily and easily removed for cleaning and reuse or replacement upon changeover between different types of fluids, for example, from one type of fluid color to another. To effect this, a retainer plate 46 is provided along the underside of catching structure 30. Retainer plate 46 may be secured to the underside of catcher structure 30 by suitable means, for example, an epoxy. More preferably, it is bolted in place and sealed with an aneorobic sealant. It projects toward tip portion 34 to form a ledge or clamping surface against which ingestion blade 38 may be releasably clamped, thereby substantially closing the bottom opening of cavity 36.

Figure 2:
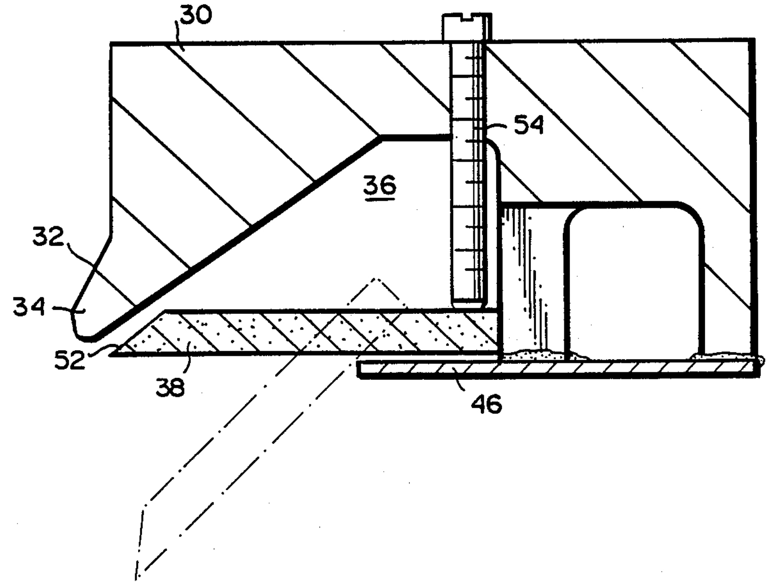

In a preferred form of the present invention, ingestion blade 38 is flat and terminates at one end in an inclined forward edge 52. The opposite end edge of blade 38 is flat and bears against a plurality of longitudinally spaced pillars or posts 51 which form ports communicating between cavity 36 and a vacuum chamber 53. A set screw 54 is threadedly received through the catcher structure and bears on the blade 38 adjacent its opposite end edge. Thus, by disposing a portion of blade 38 on the projecting ledge of retainer plate 46 and threading set screw 54 down onto the blade 38, the ingestion blade 38 may be clamped in the position illustrated in full line in FIG. 2. In that position, it will be appreciated that the major portion of blade 38 is cantilevered from the clamp provided by set screw 54 and the ledge of plate 46 for projection toward tip portion 34 and, in that orientation, substantially closes the bottom cavity opening.

To remove ingestion blade 38 from catcher structure 30, set screw 54 is backed off from the blade 38. This enables the ingestion blade to be pivoted about the projecting edge of retainer plate 46 such that it can be removed through the bottom opening of cavity 36, as illustrated by the dashed lines in FIG. 2. Accordingly, upon removal of ingestion blade 38, it can be cleaned and returned to the position illustrated by the solid lines in FIG. 2 for reuse with a fluid of a different type or color. Alternately, a new ingestion blade could be provided. To accomplish that, the new or cleaned ingestion blade 38 is simply inserted into cavity 36 into the position illustrated by the full lines in FIG. 2. The set screw 54 is then threaded such that its tip engages the upper face of the porous metal. Thus, the new or clean ingestion blade 38 is clamped between the set screw and the ledge of retainer plate 46.

It will also be appreciated that in complex fluid-jet printing machines, for example, for use in the textile industry, it is important that the catching structure couplings and connections be on one side of the structure and readily covered. The cavities for such connections and couplings are therefore located along the underside of catcher structure 30 and are closed by retainer plate 46. The couplings and connections are accordingly maintained clean and in an out-of-the-way position relative to the remaining structure of the catcher portions and machine. This structure allows the structure 30 of the catcher to be made as a single-sided casting with machining only of critical portions, rather than requiring intricate machining or the like to form the cavities and passages.

It will be appreciated that the objectives of the present invention are fully accomplished in that there has been provided an ingestion blade forming part of a catcher structure in a fluid-jet printing applicator device and which ingestion blade can be readily and easily removed and cleaned for reuse or replaced by a new blade upon changeover from one type or color or fluid to another.

In particular, many variations in the configuration of the droplet catching face may be used, including but not limited to the various embodiments of U.S. Pat. No. 4,667,207, assigned to the assignee of this application.

An additional benefit of the present invention, is that the clamping of the porous metal in the catcher structure is adjustable. Thus, the size of the intake slot between the porous metal and the tip portion 34 is adjustable, which may be helpful in catching droplets over a variety of operating conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fluid-jet printing apparatus of the type which generates an array of droplet streams and deflects selected droplets of said streams from a normal droplet path, apparatus comprising:

a droplet catcher structure for catching the deflected droplets;

an ingestion blade carried by said droplet catcher structure, said insertion blade being formed of a porous material and spaced from a portion of said droplet catcher structure to define a slot therewith enabling the deflected droplets to flow about said portion onto said ingestion blade, said catcher structure defining a cavity above said ingestion blade in communication with said slot, means for drawing a vacuum in said cavity for flowing the droplets along a predetermined path; and means carried by said droplet catcher structure for releasably mounting said ingestion blade whereby said ingestion blade may be selectively removed from said structure, said mounting means including a retainer plate carried along the underside of said catcher structure below said cavity and projecting toward said portion, said ingestion blade in part being disposed on said retainer plate and projecting beyond the edge of said plate toward said portion to substantially close the bottom of said cavity.

2. Apparatus according to claim 1 wherein said ingestion blade is generally flat, said releasable mounting means including means engaging between said droplet catcher structure and said ingestion blade.

3. Apparatus according to claim 2 wherein said engaging means includes a set screw threadably received in said droplet catcher structure and in releasable engagement with said blade.

4. Apparatus according to claim 1 wherein said ingestion blade is generally flat, said mounting means including a set screw threadedly received in said droplet catcher structure and bearing on an edge of said flat ingestion blade to clamp said blade between said plate and said screw.

5. Apparatus according to claim 1 wherein said ingestion blade is generally flat and is removable from said catcher structure through the space between said plate edge and said portion.

6. In a fluid-jet printing apparatus of the type which generates an array of droplet streams and deflects selected droplets of said streams from a normal droplet path, apparatus comprising:

a droplet catcher structure for catching the deflected droplets;

a porous ingestion blade carried by said droplet catcher structure;

means defining a droplet catcher surface for catching deflected droplets including a portion defining a slot with an edge of said ingestion blade and through which slot the deflected droplets flow to said ingestion blade, said catcher structure defining a cavity opening through a bottom portion thereof and in communication with said slot;

means for drawing a vacuum in said cavity for flowing the droplets along a predetermined path; and means carried by said droplet catcher structure including a retainer plate carried along the underside of said catcher structure for releasably clamping said ingestion blade to said catcher structure to cantilever said ingestion blade toward the slot, thereby closing most of the opening through the bottom portion of said cavity whereby said ingestion blade may be selectively removed from said structure through the bottom cavity opening.

7. Apparatus according to claim 6 wherein said ingestion blade is formed of a porous metal material.

8. Apparatus according to claim 6 wherein said ingestion blade is generally flat, said releasable clamping means including means engaging between said droplet catcher structure and said ingestion blade.

9. Apparatus according to claim 8 wherein said engaging means includes a set screw threadedly received in said droplet catcher structure and bearing adjacent and on an end of said blade to clamp said ingestion blade between said retainer plate and said screw.

10. Apparatus according to claim 9 wherein said ingestion blade is formed of a porous metal material.

11. In a droplet catcher structure with a porous fluid ingestion blade for use in a fluid-jet printing apparatus of the type which generates an array of droplet streams from fluid passing from a fluid plenum through a fluid orifice plate and deflects selected droplets of said streams from a normal droplet path to a droplet catcher structure for recirculation to said plenum, a method of preventing contamination of the fluid upon changeover from one fluid to another comprising the steps of:

providing a droplet catcher surface for catching deflected droplets and flowing the deflected droplets to said ingestion blade;

removably mounting said ingestion blade on said catching structure;

removing said ingestion blade from said catcher structure; and replacing said ingestion blade in said structure with a clean ingestion blade.

12. A method according to claim 11 wherein the step of removably mounting includes the step of releasably clamping the ingestion blade to said catcher structure.

13. A method according to claim 12 including securing a retainer plate to the underside of said catching structure, and clamping said ingestion blade between said retainer plate and said catcher structure.

14. A method according to claim 13 wherein said catcher structure has a cavity opening through the underside thereof, and removing the ingestion blade through the cavity opening.

15. A method according to claim 13 wherein the ingestion blade is clamped between the retainer plate and the catcher structure by a screw, and including backing off said screw to release said ingestion blade and threading said screw to clamp the clean ingestion blade in the catching structure.

16. A method according to claim 11 including cleaning the removed ingestion blade, and remounting the removed clean ingestion blade on said catcher structure.

17. A method according to claim 11 wherein the step of removably mounting the ingestion blade includes cantilevering the blade from the catcher structure.

18. A method according to claim 11 wherein the step of replacing includes providing a new ingestion blade for mounting to said catcher structure.

19. A catcher for a fluid-jet apparatus in which charged fluid droplets are deflected to the catcher comprising a body portion having a droplet impingement surface on which the deflected droplets impinge above an ingestion slot formed by a porous ingestion blade spaced from the impingement surface, means defining a vacuum cavity in communication with said slot, said blade being disposed in said cavity, and releasable securement means for said ingestion blade to permit release of said ingestion blade for cleaning, said securement means including a retainer plate carried by said body portion and at least partially closing said cavity with said blade therein.

20. A catcher according to claim 19 including means defining a vacuum chamber and means defining a plurality of ports between said chamber and said cavity affording communication between said chamber and said cavity.

21. A catcher according to claim 20 wherein said retainer plate forms part of said vacuum chamber defining means and at least partially closing said chamber.

22. A catcher according to claim 20 wherein said ports defining means forms an abutment for said blade opposite the edge thereof forming said slot.

* * * * *